(12) United States Patent
Litwack

(10) Patent No.: US 8,077,606 B1
(45) Date of Patent: Dec. 13, 2011

(54) MULTIMEDIA DATA FLOW DROPPING WITH NOTIFICATION

(75) Inventor: Mark Litwack, West Chester, PA (US)

(73) Assignee: Cisco Technology, Inc., San Jose, CA (US)

( * ) Notice: Subject to any disclaimer, the term of this patent is extended or adjusted under 35 U.S.C. 154(b) by 1269 days.

(21) Appl. No.: 11/292,757

(22) Filed: Dec. 2, 2005

Related U.S. Application Data

(63) Continuation-in-part of application No. 11/225,302, filed on Sep. 12, 2005.

(51) Int. Cl.
G01R 31/08 (2006.01)

(52) U.S. Cl. ........................................................ 370/229

(58) Field of Classification Search .................. 370/235, 370/236, 236.1, 236.2, 230.1, 231, 395.1; 709/232, 233, 234, 235
See application file for complete search history.

(56) References Cited

U.S. PATENT DOCUMENTS

| | | | |
|---|---|---|---|
| 5,828,653 A | 10/1998 | Goss | |
| 6,052,376 A | 4/2000 | Wills | |
| 6,134,239 A | 10/2000 | Heinanen et al. | |
| 6,157,613 A * | 12/2000 | Watanabe et al. | 370/229 |
| 6,188,671 B1 * | 2/2001 | Chase et al. | 370/232 |
| 6,336,143 B1 | 1/2002 | Diedrich et al. | |
| 6,363,069 B1 | 3/2002 | Levy et al. | |
| 6,377,547 B1 | 4/2002 | Levy et al. | |
| 6,424,620 B1 * | 7/2002 | Nishihara | 370/229 |
| 6,851,008 B2 * | 2/2005 | Hao | 710/305 |
| 6,870,812 B1 | 3/2005 | Kloth et al. | |
| 6,922,396 B1 | 7/2005 | Knappe | |
| 6,934,256 B1 | 8/2005 | Jacobson et al. | |
| 6,981,054 B1 | 12/2005 | Krishna | |
| 7,035,212 B1 | 4/2006 | Mittal et al. | |
| 7,061,861 B1 | 6/2006 | Mekkittikul et al. | |
| 7,106,691 B1 | 9/2006 | DeCaluwe et al. | |
| 7,299,277 B1 | 11/2007 | Moran et al. | |
| 7,376,085 B2 | 5/2008 | Yazaki et al. | |
| 7,417,995 B2 | 8/2008 | Rabie et al. | |
| 7,450,509 B2 * | 11/2008 | Hao | 370/234 |
| 7,480,239 B1 | 1/2009 | Sundaresan et al. | |
| 7,809,007 B2 * | 10/2010 | Mayhew et al. | 370/412 |
| 2001/0048662 A1 | 12/2001 | Suzuki et al. | |
| 2002/0003777 A1 | 1/2002 | Miyamoto | |
| 2002/0054568 A1 | 5/2002 | Hoogenboom et al. | |
| 2002/0097678 A1 | 7/2002 | Bisher, Jr. et al. | |
| 2002/0122387 A1 | 9/2002 | Ni | |
| 2003/0002438 A1 | 1/2003 | Yazaki et al. | |
| 2003/0123447 A1 | 7/2003 | Smith | |

(Continued)

OTHER PUBLICATIONS

Alberto leon garcia, indra Widjaja, Communication networks, Jul. 16, 2003, Higher Education, 2nd, p. 601-602.*

(Continued)

*Primary Examiner* — Chi Pham
*Assistant Examiner* — Fan Ng
(74) *Attorney, Agent, or Firm* — Patterson & Sheridan, LLP

(57) ABSTRACT

A method and system for correcting a congestion condition within a network, the method including notifying the sender and receiver of a multimedia data flow or flows that the multimedia data flows have been dropped due to the presence of the congestion condition. The method including the steps of determining at least one multimedia data flow that will be dropped to relieve the congestion condition; constructing notification messages for the source and destination of the dropped flows; and sending the notification message to the source and destination of the dropped multimedia data flows.

23 Claims, 13 Drawing Sheets

U.S. PATENT DOCUMENTS

| | | |
|---|---|---|
| 2004/0008697 A1 | 1/2004 | Millard et al. |
| 2004/0081080 A1 | 4/2004 | Ji et al. |
| 2004/0085984 A1 | 5/2004 | Elzur |
| 2004/0192333 A1* | 9/2004 | Khokhar .................... 455/456.1 |
| 2005/0192812 A1* | 9/2005 | Buchholz et al. ............. 704/278 |
| 2005/0276230 A1* | 12/2005 | Akahane et al. .............. 370/252 |
| 2006/0007859 A1* | 1/2006 | Kadambi et al. .............. 370/229 |
| 2006/0114820 A1 | 6/2006 | Hunt et al. |
| 2006/0159016 A1* | 7/2006 | Sagfors et al. ................ 370/230 |
| 2006/0184990 A1* | 8/2006 | Kwak et al. ................... 725/111 |
| 2006/0198308 A1* | 9/2006 | Vasseur et al. ................ 370/238 |
| 2006/0251000 A1* | 11/2006 | Williams ...................... 370/315 |

OTHER PUBLICATIONS

Office Action history of U.S. Appl. No. 11/225,302, date ranging from Jun. 13, 2008-Jan. 5, 2011.

* cited by examiner

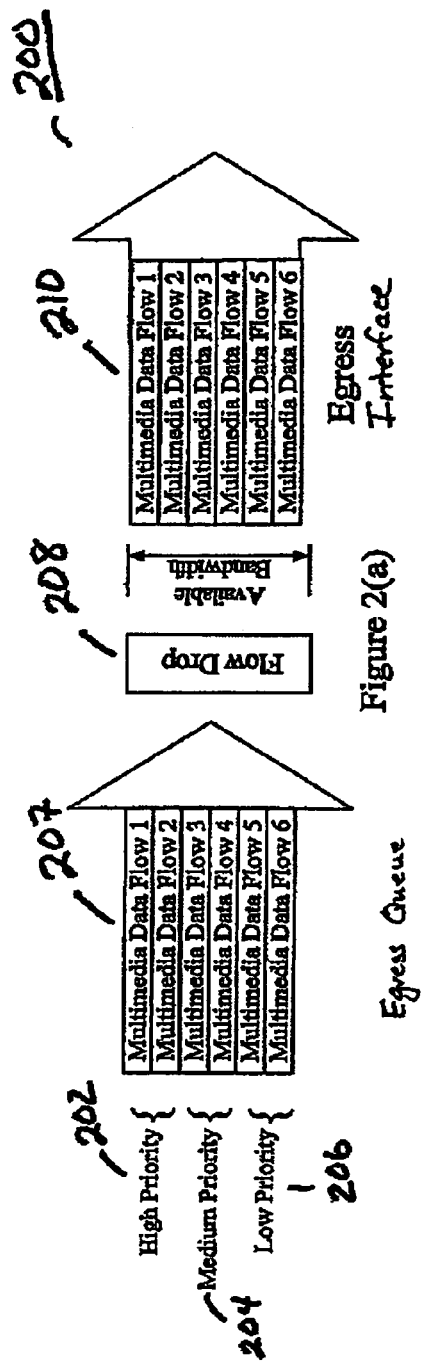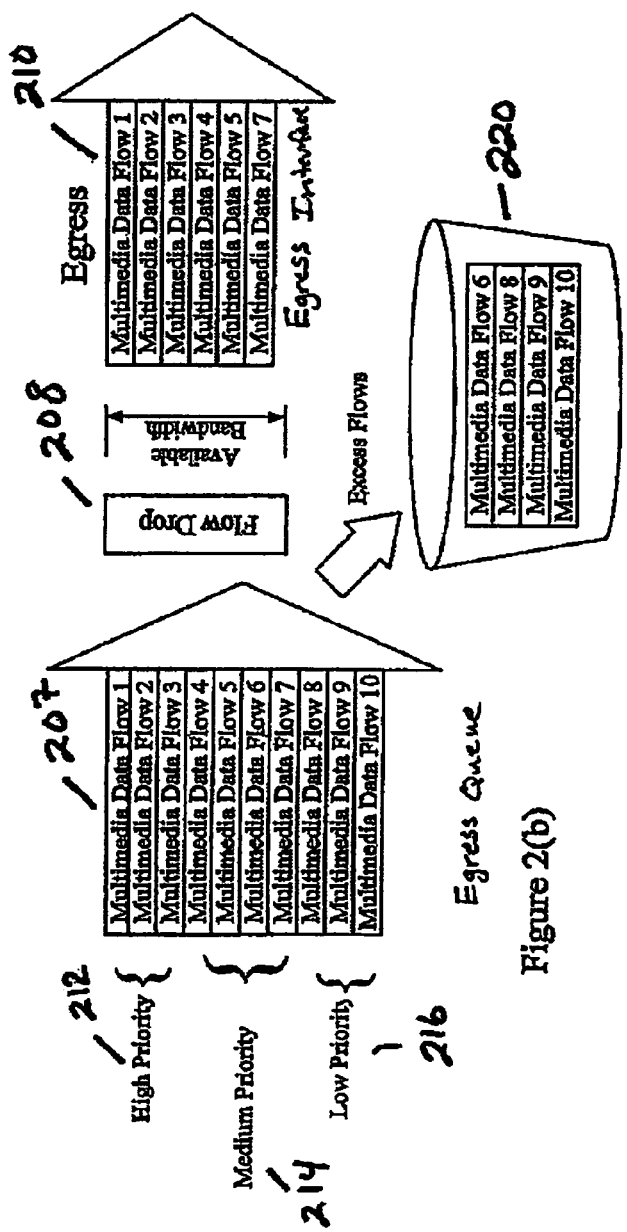
Figure 2(a)
Figure 2(b)

Notification for a single source, multiple flows

Notification for a single destination, multiple flows

MULTIMEDIA DATA FLOW DROPPING WITH NOTIFICATION

RELATED APPLICATION

This application is a continuation-in-part of U.S. patent application Ser. No. 11/225,302, entitled "Multimedia Data Flow Dropping" of Mark Litwack, that was filed on Sep. 12, 2005, which is herein incorporated by reference.

BACKGROUND OF THE INVENTION

1. Field of the Invention

The present invention relates generally to resource management and admission control of multimedia data flows and more specifically to management of multimedia data flows that are congested.

2. Description of Background Art

Multimedia data broadcast over an IP (Internet Protocol) infrastructure is a well-known way of transmitting and receiving multimedia data in today's information age. Unlike other forms of data (like text data), multimedia data is dependent upon an uninterrupted, constant flow of data packets (constant bit rate or CBR), to maintain the quality of the data received by an end user. The data packets in a multimedia data flow for standard cable TV viewing proceed through the IP network at a constant bit rate, such as 3.75 M bits per second which corresponds to 356 IP packets/second. Multimedia data flow for CATV or HDTV systems is transmitted through the IP network to an end user's set top box (STB). The set top box is designed to receive the multimedia data flow and format the data properly for display on the user's television.

Difficulties arise during management of multimedia data over an IP network during times of congestion. CBR multimedia data over IP networks cannot use conventional congestion control techniques such as RED, WRED, etc. Applying these methods causes severe degradation to all multimedia data flows traversing the link. In conventional systems during periods of congestion, all degraded multimedia data flows are allowed to pass through the IP network and are received by the set-top box. Because the STB is receiving some information, albeit corrupted information, the STB is unable to detect and report a problem to the data sender. Conventional congestion control methods do not always preserve the integrity of any of the multimedia data flows during a period of network link congestion.

When congestion occurs in a conventional network, a need arises to notify the source. Several congestion notification techniques exist for notifying a source of a congestion condition within a network. In Internet Control Message Protocol (ICMP), a gateway within the IP network may send a source quench message to an internet source of a multimedia data flow if the multimedia data is being sent too fast for the gateway to handle. A destination host may also send a source quench message if multimedia data flows arrive too fast to be processed. The source quench message is a request to the source to decrease the rate at which it is sending multimedia data flows to the internet destination. On receipt of a source quench message, the source host decreases the rate at which it is sending traffic to a predetermined rate or pauses the traffic to the specified destination for a predetermined period of time.

Another method for congestion notification is forward-explicit congestion notification (FECN) and backward-explicit congestion notification (BECN) within a Frame Relay network. FECN involves a header bit transmitted by the source (sending) terminal requesting that the destination (receiving) terminal slow down its requests for data. BECN (backward explicit congestion notification) involves a header bit transmitted by the destination terminal requesting that the source terminal send data more slowly. FECN and BECN are controlled by a single bit contained in the Frame Relay frame header. The Frame Relay frame header also contains a Discard Eligibility (DE) bit, which is used to identify less important traffic that can be dropped during periods of congestion.

Significant drawbacks are present within the ICMP and Frame Relay congestion notification techniques. The source quench message of ICMP and Frame Relay are sent only to the source. Moreover, the techniques do not take into consideration the fact that in today's media-rich environment, a single entity on a network may be a source or destination for multiple streams of data.

What is needed is an efficient way of improving network congestion notification.

BRIEF DESCRIPTION OF THE DRAWINGS

FIG. 2A is a block diagram of a congestion control unit operating during a period of un-congested flow, in accordance with an embodiment of the present invention.

FIG. 2B is a block diagram of a congestion control unit operating during a period of congested flow, in accordance with an embodiment of the present invention.

DETAILED DESCRIPTION OF PREFERRED EMBODIMENTS

A preferred embodiment of the present invention is now described with reference to the FIGs where like reference numbers indicate identical or functionally similar elements. Also in the FIGs, the leftmost digit(s) of each reference number correspond(s) to the FIG in which the reference number is first used.

An embodiment of the present invention introduces a congestion control mechanism for constant bit rate (CBR) multimedia data flows in IP networks. A flow drop method within a congestion control unit of the present invention chooses a subset of multimedia data flows to drop, in whole, to alleviate a congestion condition. Substantial benefits are provided by the claimed invention. After the congestion condition is detected and the congestion control unit begins dropping multimedia data flows, the remaining multimedia data flows are no longer degraded for the end user, as compared to conventional congestion management systems. Also, the complete drop of only a portion of the multimedia data flows allows those user devices associated with the dropped flows to detect the problem and take corrective or alternate action.

According to an embodiment, the present invention is invoked by a congestion condition being reached, or by a configurable bandwidth threshold. After detecting the congestion condition, the flow drop method randomly selects one or more of the multimedia data flows to be dropped. This randomly selected flow is completely dropped from the data transmission. If congestion continues, another flow, as determined by the congestion control unit, is dropped, and so on, until congestion subsides or the configurable bandwidth threshold is reached.

Figure 1:
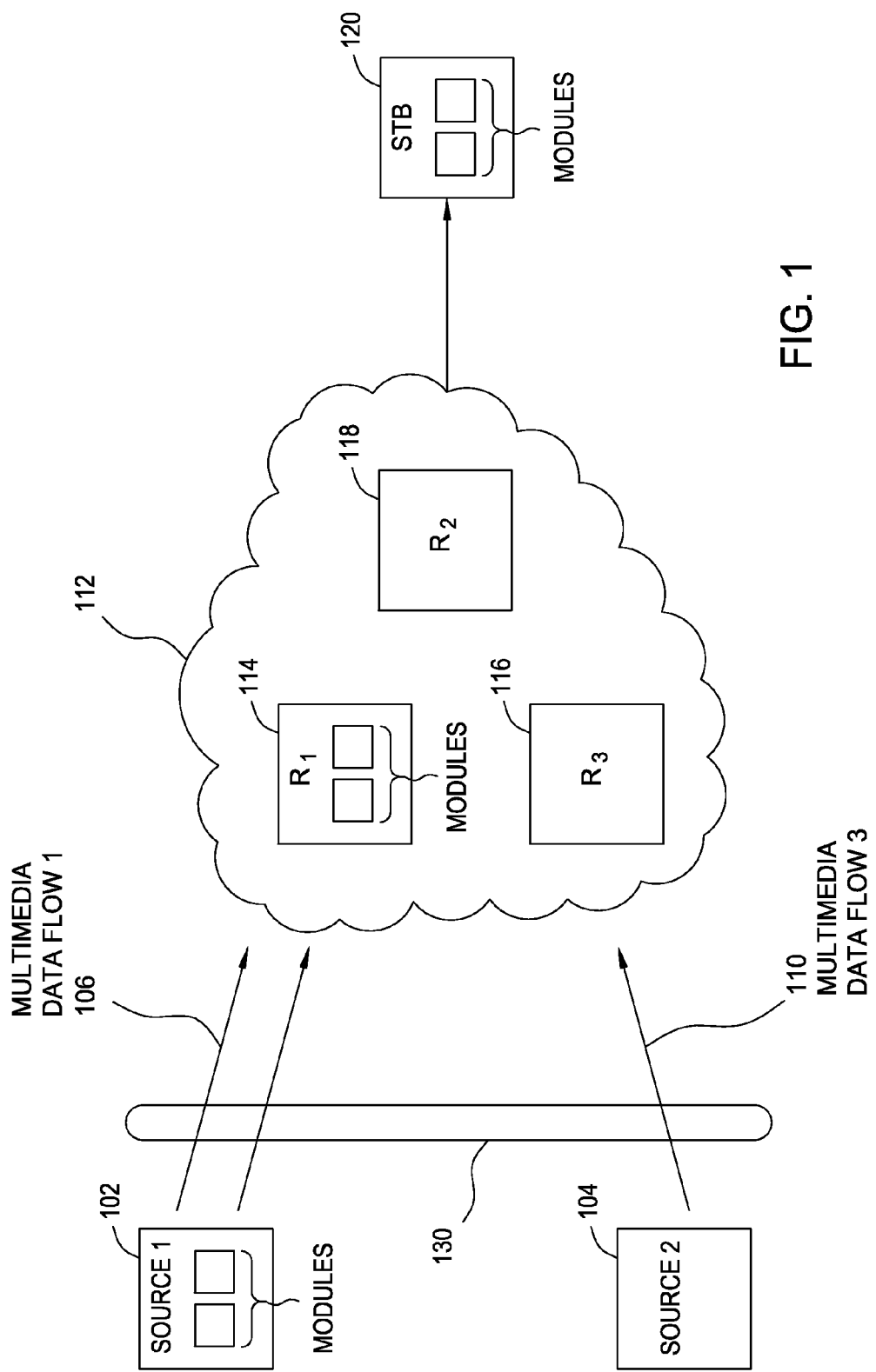
FIG. 1 is a block diagram of a multimedia data over IP network in accordance with an embodiment of the present invention.

FIG. 1 is a block diagram of multimedia data over an IP network in accordance with an embodiment of the present invention. The multimedia data over IP network of FIG. 1 contains a first multimedia data source 102 and a second multimedia data source 104 communicatively coupled, via a wired or wireless connection 130, to an IP network 112. The first multimedia data source 102 produces a first and a second multimedia data flow 106, 108 of constant bit rate multimedia data and the second multimedia data source 104 produces a third multimedia data flow 110 of constant bit rate video data. Each multimedia data flow is passed to the IP network 112 by way of the wired or wireless connection 130. The multimedia data flows 106, 108, 110 contain a sequence of multimedia data packets that represent one or more streams of multimedia data. An example of a multimedia data flow containing a single stream of data is video-on-demand, carried in MPEG Single Program Stream format. An example of a multimedia data flow containing multiple streams of data is network television programming (each stream represents a different television program), carried in MPEG Multiple Program Stream format. A skilled artisan will appreciate various embodiments similar to the one described in FIG. 1 where any particular number of multimedia data sources are available, each producing one or more flows of constant bit rate multimedia data into IP network 112.

Within the IP network 112 is a first router 114, a second router 118, and a third router 116. IP network 112 is communicatively coupled, via a wired or wireless connection 140, to an end user's set-top-box (STB) 120. First router 114, second router 118, and third router 116 determine the next network point to which a data packet within a particular multimedia data flow should be forwarded, enroute to its destination. First router 114, second router 118, and third router 116 also create or maintain a table of the available routes for a given multimedia data flow and use this information to determine a route for packets in the given multimedia data flow to proceed through the IP network 112. A skilled artisan will envision a multimedia data over IP network with any number of routers within the network arranged to determine routes for transmitting multimedia data flow from a variety of multimedia sources to one or more destinations (i.e., one or more STBs).

FIG. 2A is a block diagram of a congestion control unit 200 operating during a period of un-congested flow, in accordance with an embodiment of the present invention. The congestion control unit 200 diagramed in FIGS. 2A and 2B can be implemented on any number of the routers within the IP network 112 of FIG. 1. A flow drop method (or unit) 208, within the congestion control unit 200, is designed to monitor multimedia data flow between one or more ingress interfaces and an egress interface 210 of the particular router that is hosting the congestion control unit 200. The flow drop method operates on the construct of a logical egress queue 207 and a physical egress interface 210. The term "logical" is used because specific implementations may distribute queuing to multiple components within the device, including the physical ingress interfaces.

FIG. 2A shows six different 1.0 Gbps multimedia data flows passing between the egress queue 207 and the egress interface 210. The flow drop method 208 determines there is a total of 6.0 Gbps of available bandwidth between the egress queue 207 and the egress interface 210 of this particular router. In this example, the congestion control unit 200 is operating in an un-congested state because the total amount (6.0 Gbps) of multimedia data flow attempting to exit the egress interface 210 is less than or equal to the available bandwidth (6.0 Gbps). A congestion condition has not been reached therefore, the flow drop method 208 does not drop any multimedia data flows. In another embodiment, a skilled artisan will appreciate that a variety of different incoming multimedia data flows that occupy any particular amount of available bandwidth as required by a particular application.

The individual multimedia data flows, as shown in FIG. 2A, contain certain information that is used by the flow drop method 208 to determine at least one of the source, destination, or priority level of a particular flow of multimedia data attempting to pass through the egress interface 210. A more detailed discussion of the information used to define a particular multimedia data flow is addressed below.

As shown in FIG. 2A, incoming multimedia data flow can be categorized by the particular priority level of the multimedia data flow. In FIG. 2A, an incoming multimedia data flow is categorized as a high 202, medium 204, or low 206 priority. The priority level is defined, for example, by the source and destination information embedded within the header information of data packets within a particular multimedia flow, or it could be directly encoded in the IP ToS/DSCP (Type of Service or Differentiated Services Code Point) field. There may also be additional information in a multimedia data packet, such as RTP (Real-Time Protocol) header information, that routers may want to examine to determine priority information. In an embodiment, priority levels are critical broadcast data (high priority), paid for video-on-demand (medium priority), and free video-on-demand (low priority). A skilled artisan will appreciate that any variety of priority levels that can be assigned to the incoming multimedia data flows passing through egress interface 210. Other embodiments may use more or fewer priority levels depending on the particular constraints of the network.

In an embodiment, within a network router, a separate logical egress queue (or multiple queues) can be established to store multimedia data flows of a particular priority level to be sent out egress interface 210. The congestion control unit 200, operating on the logical egress queue 207, and the flow drop method 208 make decisions as to which queue is filled if there are multiple queues present within egress queue 207. These decisions are based on values in the multimedia data flow header, such as IP addresses, UDP port numbers, and DSCP/TOS values, using well-known routing techniques. The flow drop method 208 can be implemented in either hardware or software.

FIG. 2B is a block diagram of a congestion control unit 200 operating during a period of congested flow, in accordance with an embodiment of the present invention. FIG. 2B contains three 1.0 Gbps multimedia data flows assigned with a high priority 212, four 1.0 Gbps multimedia data flows assigned with a medium priority 214, and three 1.0 Gbps multimedia data flows assigned with a low priority 216. The total multimedia data flow into the logical egress queue 207 is 10.0 Gbps. In FIG. 2B, flow drop method 208 determines there is only 6.0 Gbps available bandwidth at the egress interface 210. In this embodiment, the congestion control unit 200 is operating in a congested state. A congestion condition has been reached because the total amount (10.0 Gbps) of multimedia data entering the egress queue 207 is greater than the available bandwidth (6.0 Gbps) of the egress interface 210. In another embodiment, a congestion condition is reached when the total amount of multimedia data entering the egress queue 207 is at 99% of the available bandwidth at the egress interface 210. In another embodiment, a congestion condition is determined when one or more egress queues are full. A skilled artisan will appreciate that a variety of methods can be used to determine a congestion condition. In general, any particular condition that is causing sustained packet loss can be considered a congestion condition. In an embodiment, a congestion condition can be determined when a particular flow of multimedia data is losing one multimedia data packet per second of data.

When a congestion condition has been reached, the flow drop method 208 is adapted to drop lower priority multimedia data flows. A more detailed discussion of dropping multimedia data flows occurs later on. Once an appropriate number of multimedia data flows have been dropped, the congestion condition is relieved and the flow of multimedia data flows from the logical egress queue 207 to the egress interface 210 returns to an un-congested state. Here, flow drop method 208 drops all of the low priority flows (8, 9, 10) and one randomly chosen medium priority flow (6). Dropped packets are logged or archived in memory 220. The flow dropping method of the present invention is adapted to drop all packets and streams associated with a particular flow that is marked as dropped. In certain embodiments, because an entire flow is being dropped, the source receives some form of notification that the flow has been dropped, thus discontinuing the transmission of that particular flow. The receiver of a dropped flow may also receive a notification that the flow has been dropped by the network. Certain accounting information, including UDP, IP, RTP source and destination addresses, can be used to identify a packet as a member of a particular flow when determining which flows to drop. The accounting information can also aid in the determination of the priority level of a particular multimedia data flow.

Figure 3A:
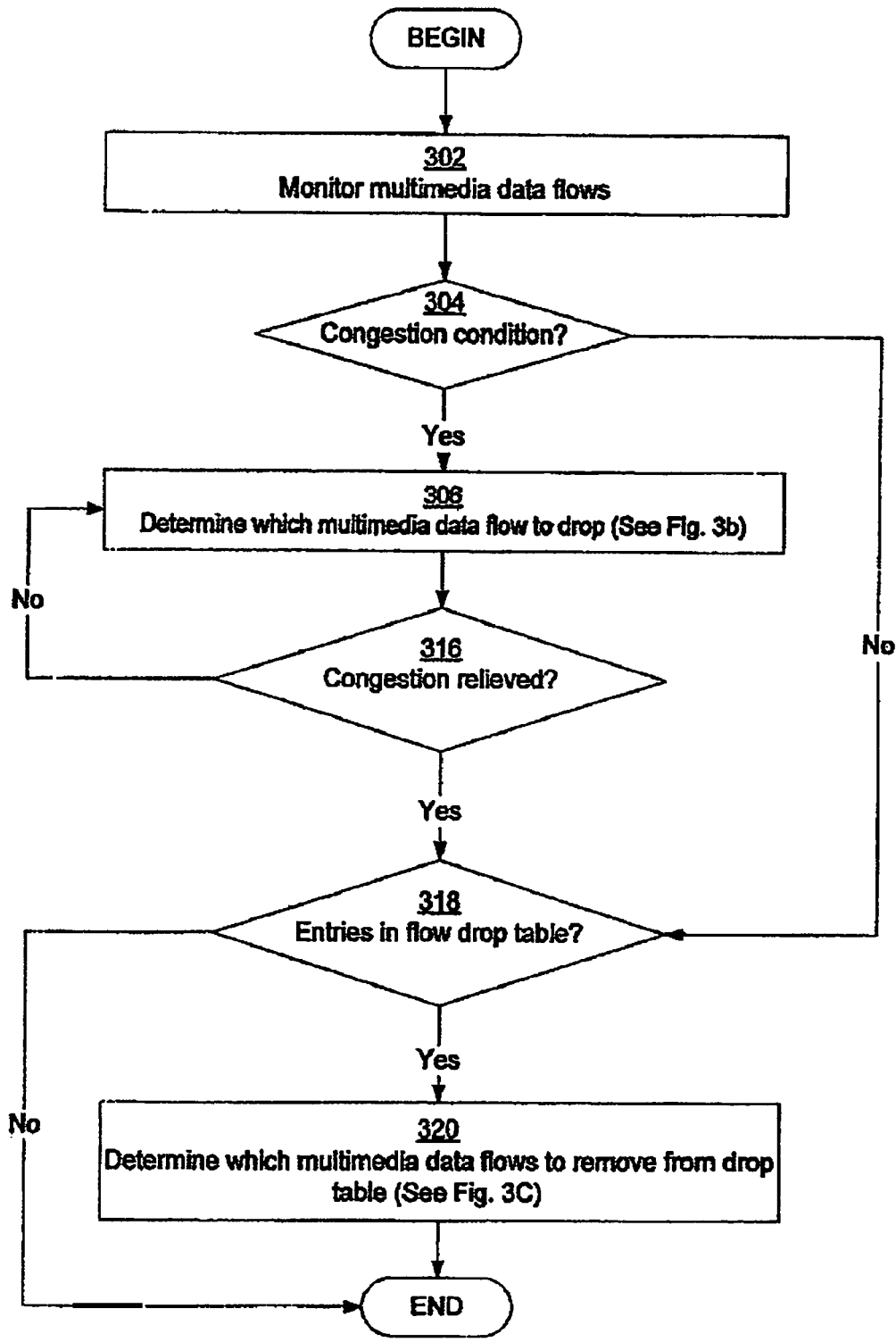
FIGS. 3A-3C are a series of flow diagrams describing a method for congestion control in a network in accordance with an embodiment of the present invention.
Figure 3B:
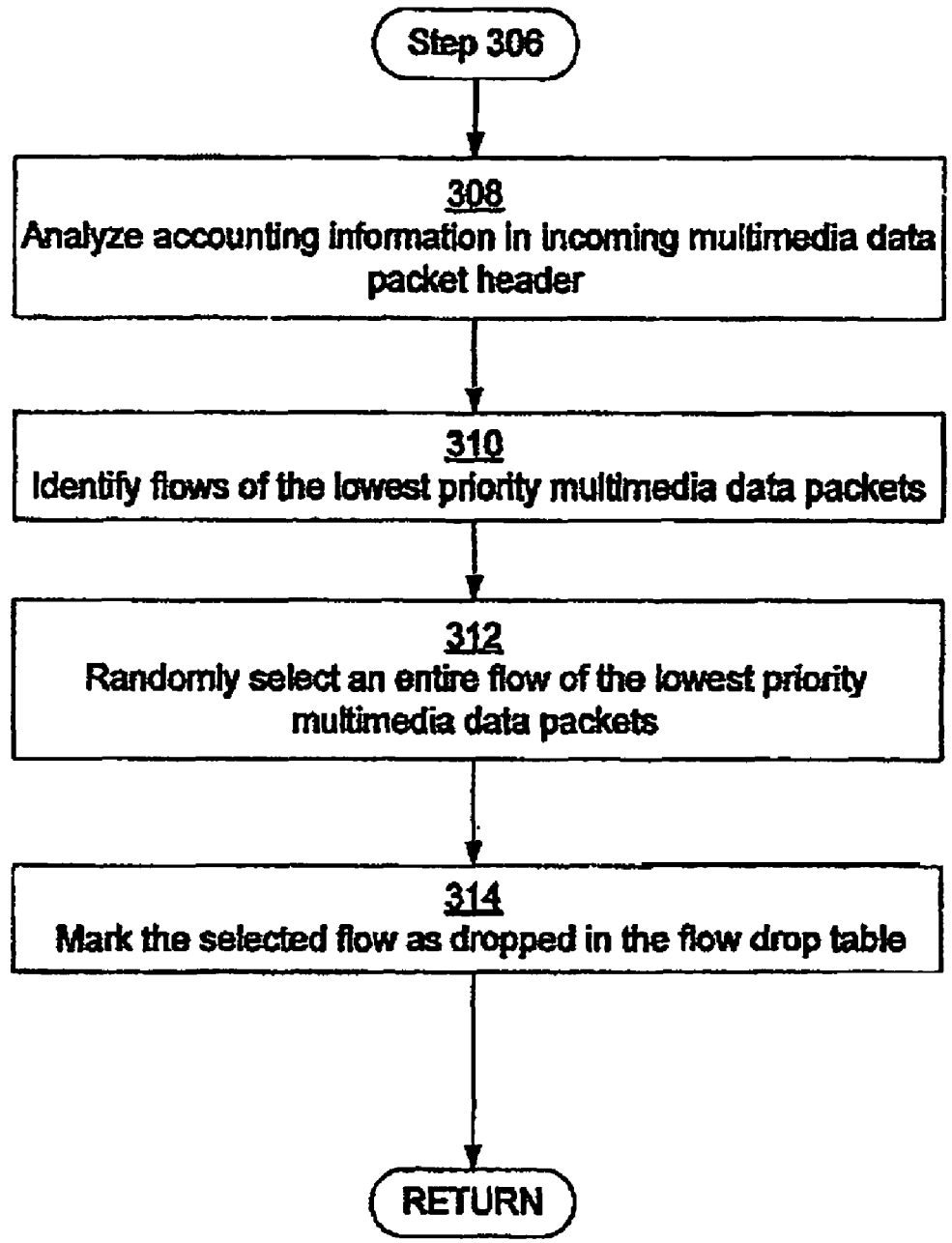
Figure 3C:
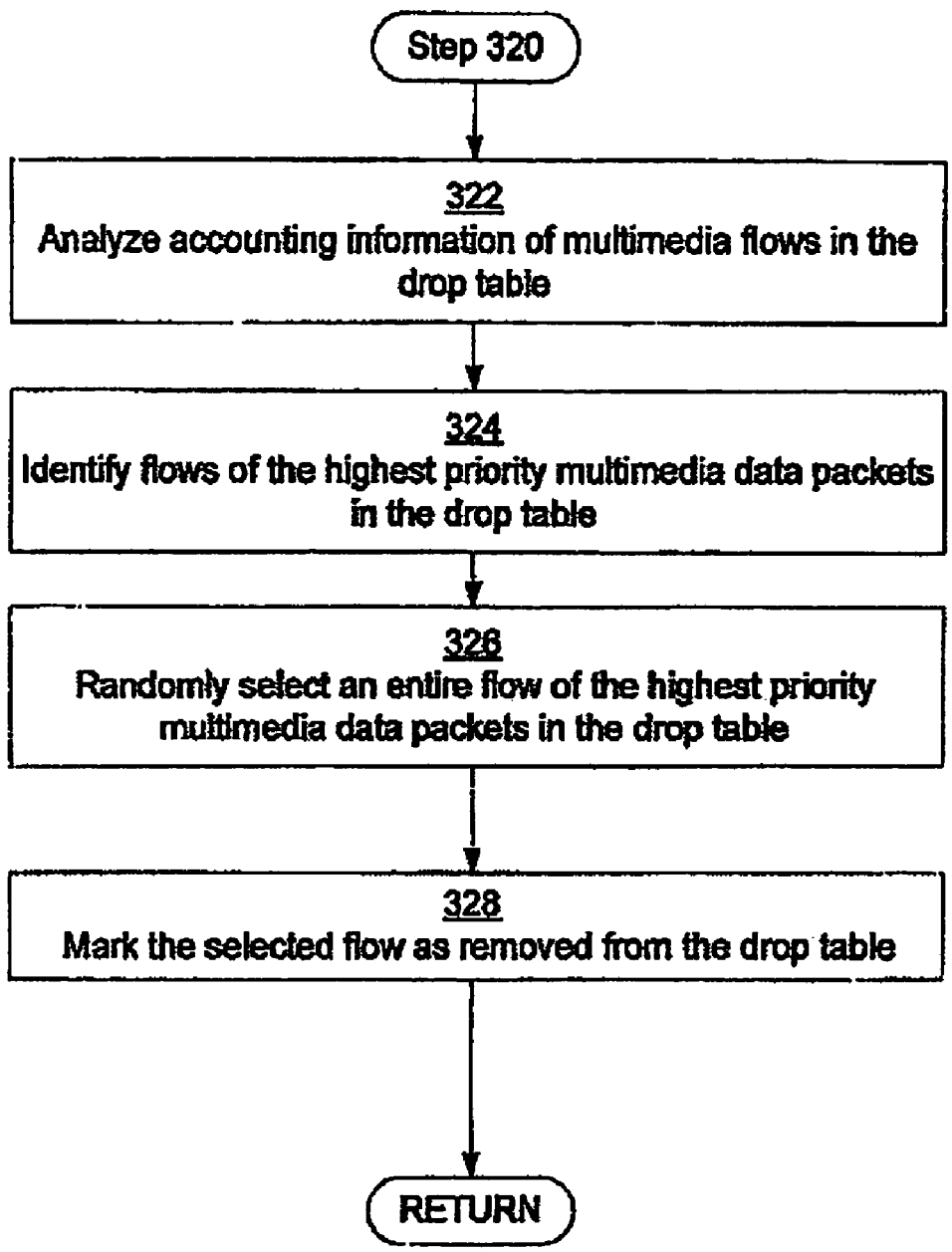

FIGS. 3A-3C are a series of flow diagrams describing a method for congestion control in a network in accordance with an embodiment of the present invention. In FIG. 3A, the congestion control unit 200 monitors 302 the flow of multimedia data flows into egress queue 207. In an embodiment, a network router, similar to the routers shown in FIG. 1, contains the egress interface 210 and congestion control unit 200. The frequency with which the congestion control unit 200 monitors the flow of multimedia data depends on the constraints of the particular network that is hosting the congestion control unit 200. The rate at which the flows are monitored can be based on available router resources, such as sufficient CPU power. In another embodiment, the invocation of the flow drop method 208 can be on-demand, triggered by the detection of a congestion condition. In an embodiment, monitoring the multimedia data flows can occur once every second, once every half-second, or once every minute. Other embodiments can support monitoring multimedia data flows more or less frequently.

Within the congestion control unit 200, the flow drop method 208 monitors 302 the multimedia data flows and determines 304 whether a congestion condition occurs. If no congestion occurs, the flow drop method 208 instructs the congestion control unit 200 to continue monitoring the flow of multimedia data flows until a congestion condition does occur. Once a congestion condition occurs, the flow drop method 208 determines 306 which flow or sets of flows are to be dropped in order to relieve 316 the congestion condition.

The determination of which flows are dropped by flow drop method 208 continues in FIG. 3B. The flow drop method 208 analyzes 308 the accounting information embedded within the header of an incoming multimedia data packet and identifies 310 flows of the lowest priority multimedia data packets. The flow drop method 208 then randomly selects 312 an entire flow of the lowest priority multimedia data packets and marks 314 the selected flow as dropped in a flow drop table. In another embodiment, the flow drop method 208 is capable of estimating how many lower priority multimedia data flows in a set of flows are needed to alleviate the congestion condition. The flow drop method 208 adds up the bandwidth for each lower priority flow and compares the sum with the available bandwidth to determine how many flows, in a set of flows, to drop from the network. In this embodiment, the method then drops the estimated set of multimedia data flows to alleviate the congestion condition. The dropped multimedia data flows (or information about them) are then logged or archived in memory unit 220, and the method returns the congestion control unit 200 to monitoring multimedia data flows. In an embodiment, accounting information about the non-dropped multimedia data flows is also recorded and used for later calculations.

The flow drop method 208 is adapted to continue dropping flows until the congestion condition is relieved. Once the congestion condition is relieved 316, the flow drop method 208 determines 318 whether any entries remain in the flow drop table. If the flow drop method 208 determines there are entries in the flow drop table, the flow drop method 208 is adapted to carry out the steps outlined in FIG. 3C for removing entries from the flow drop table. If the flow drop method determines in step 318 that no entries remain in the flow drop table, then the method is complete.

The determination of which flows are removed by flow drop method 208 from the flow drop table continues in FIG. 3C. The flow drop method 208 analyzes 322 the accounting information embedded within the header of any multimedia data flows listed in the flow drop table. The flow drop method 208 identifies 324 flows of the highest priority multimedia data packets in the drop table and randomly selects 326 an entire flow of the highest priority multimedia data packets. The flow drop method 208 marks 328 the selected flow as removed from the flow drop table and the selected flow is allowed to pass through the network. In another embodiment, the flow drop method 208 is capable of estimating how many higher priority multimedia data flows in a set of flows can be allowed to return to the network without re-introducing the congestion condition. The flow drop method adds up the bandwidth for each higher priority flows in the drop table and compares the sum with the available bandwidth to determine how many flows, in a set of flows, to release back into the network. In this embodiment, the flow drop method 208 removes the estimated set of multimedia data flows from the flow drop table without re-introducing the congestion condition. After the flow drop method 208 determines 320 which multimedia data flows to remove from the drop table, the method is complete.

Figure 4A:
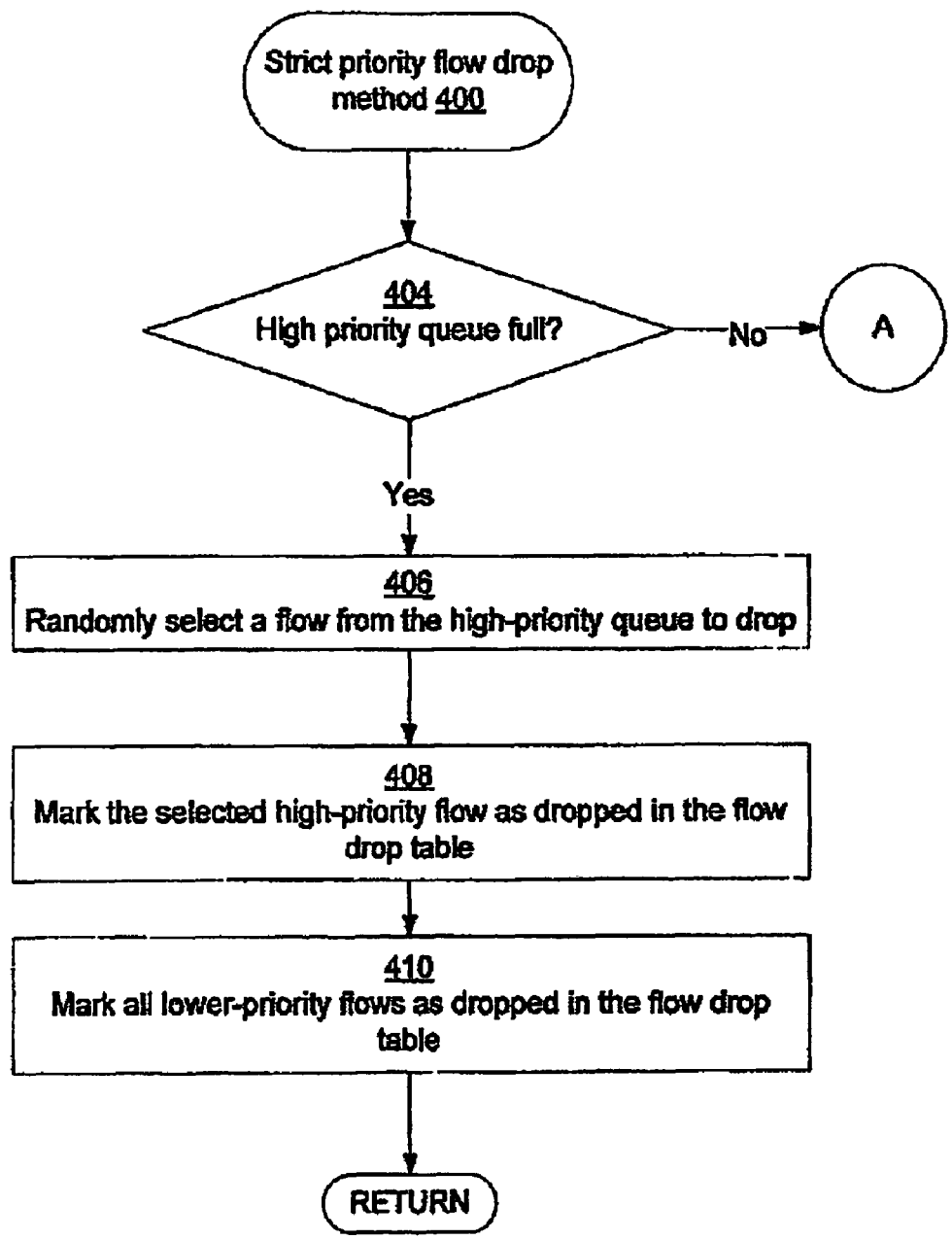
FIGS. 4A-4C are a series of flow diagrams describing a method for determining which multimedia data flows to drop in accordance with a strict priority dequeuing embodiment of the present invention.
Figure 4B:
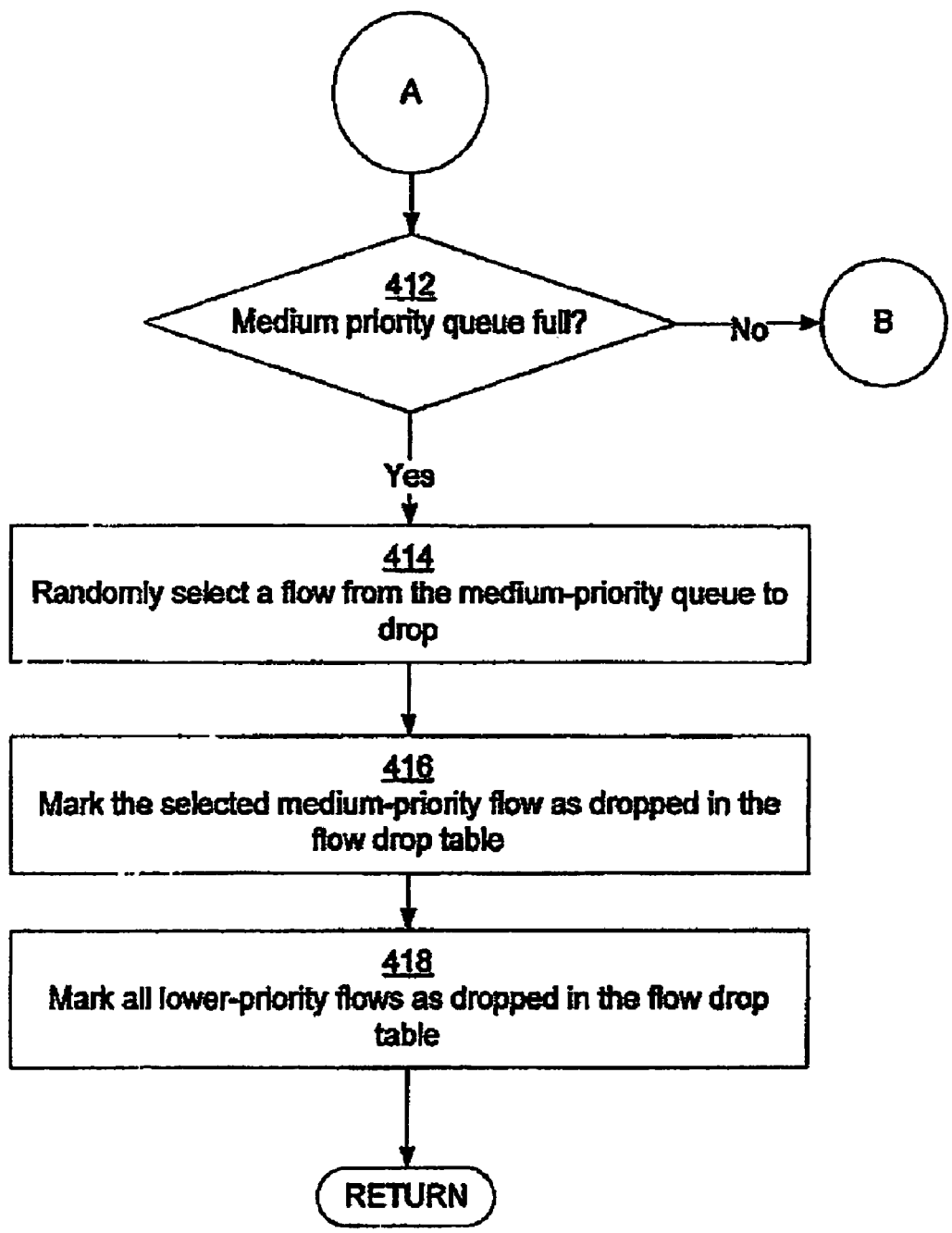
Figure 4C:
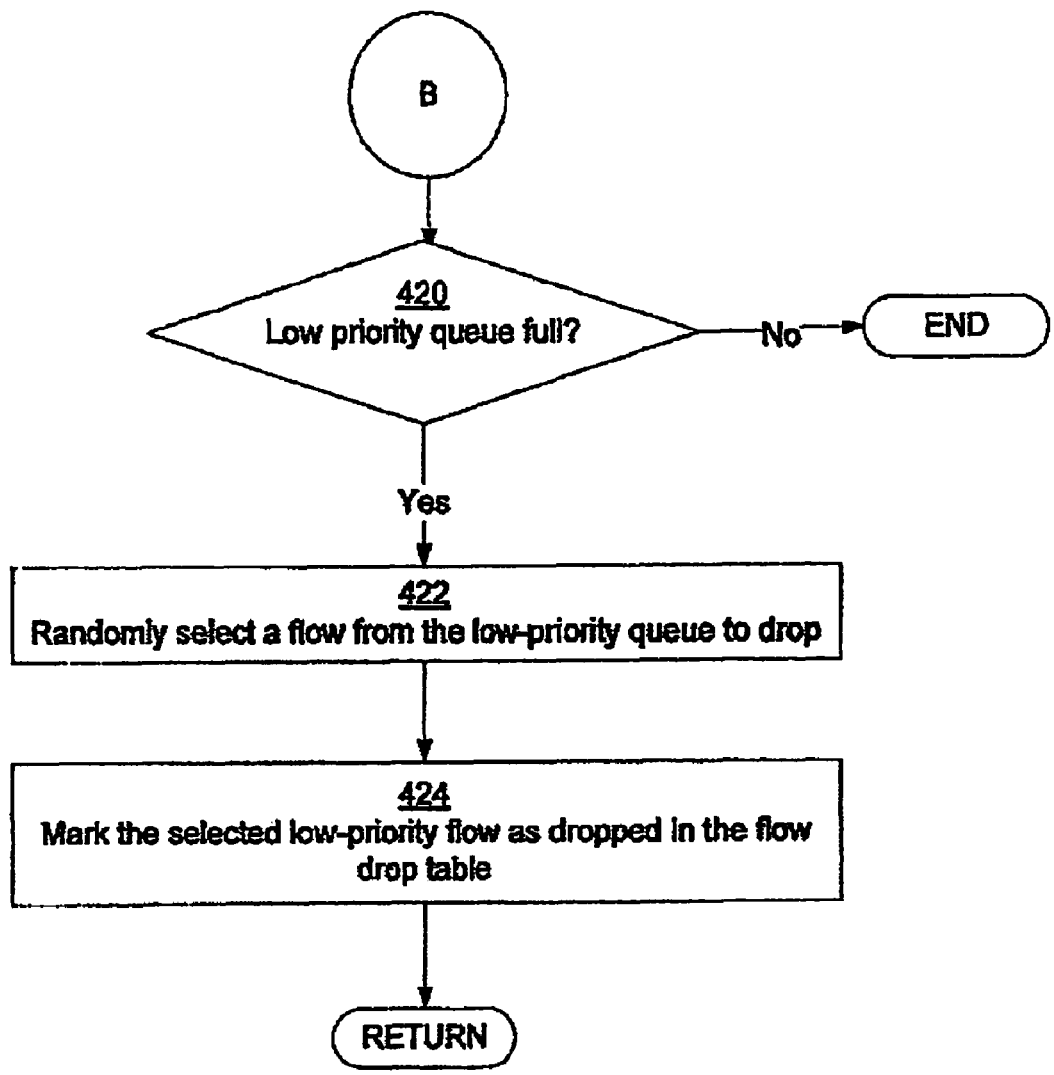

FIGS. 4A-4C are a series of flow diagrams describing a method 400 for determining which multimedia data flows to drop in accordance with a strict priority dequeuing embodiment of the present invention. The method described in FIGS. 4A-4C assumes that incoming multimedia data packets at an egress interface (like those shown in FIG. 1) are sorted through a strict priority queuing basis. During strict priority queuing, multimedia data packets arriving at the egress queue are sorted into one or more queues based on their priority. The priority can be ascertained by examining the TOS or DSCP header bits or other header information within the multimedia data packet. A dequeuing and transmitting algorithm dequeues the packets on a strict priority basis: If the highest priority queue has a packet to be sent it is sent immediately, if there is no packet in the highest priority queue, then the next highest priority queue is examined, and so on. If a packet is found in a queue it is sent and the dequeuing algorithm starts from the beginning at the highest priority queue. This method guarantees that all packets in a higher priority queue are sent before any other lower priority queue. Congestion starves the lower priority queues, and in severe congestion they are not able to send any packets at all.

The congestion control unit 200 is adapted to monitor multimedia data flows in a strict priority dequeuing embodiment. In this embodiment, when the flow drop method 208 detects a full egress queue in step 304 of FIG. 3A, the method 208 is adapted to begin dropping all packets in a multimedia data flow or all packets in multiple multimedia data flows to combat the congestion condition. A process 400 for determining which flow or sets of flows to drop from the flow is outlined in FIGS. 4A-4C for an IP network that supports multimedia data flows of at least three different priority levels, like those shown in FIG. 2B.

Initially, the flow drop method 208 determines 404 if the high priority queue is full. If the high priority queue is full, the flow drop method 208 randomly selects 406 a high-priority flow to drop and marks 408 the selected high-priority flow as dropped in the flow drop table. The flow drop method 208 then marks 410 all multimedia data flows in the lower priority queues as dropped in the flow drop table. The dropped multimedia data flows (or information about them) are then logged or archived in memory unit 220 and the method 208 returns the congestion control unit 200 to step 316. In another embodiment, the flow drop method 208 is capable of estimating how many high-priority multimedia data flows, in a set of high-priority flows, to drop in order to alleviate the congestion condition. In this embodiment, the method then drops the estimated set of high-priority multimedia data flows, along with all multimedia data flows from the lower priority queues, to alleviate the congestion condition.

If the flow drop method 208 determines 404 that the high-priority queue is not full, the method moves to FIG. 4B where it determines 412 if the medium-priority queue within egress interface 210 is full. If the medium priority queue is full, the flow drop method 208 randomly selects 414 a medium-priority flow to drop and marks 416 the selected medium-priority flow as dropped in the flow drop table. The flow drop method 208 then marks 418 all multimedia data flows in lower priority queues as dropped in the flow drop table. The dropped multimedia data flows (or information about them) are then logged or archived in memory unit 220 and the method 208 returns the congestion control unit 200 to step 316. In another embodiment, the flow drop method 208 is capable of estimating how many medium-priority multimedia data flows, in a set of medium-priority flows, to drop in order to alleviate the congestion condition. In this embodiment, the method then drops the estimated set of medium-priority multimedia data flows, along with all multimedia data flows from the lower priority queues, to alleviate the congestion condition.

If the flow drop method 208 determines 412 that the medium-priority queue is not full at the egress interface 210, the method moves to FIG. 4C where it determines 420 if the low priority queue is full. If the low priority queue is full, the flow drop method 208 randomly selects 422 a low-priority flow to drop and marks 424 the selected low-priority flow as dropped in the flow drop table. The dropped multimedia data flows (or information about them) are then logged or archived in memory unit 220 and the method 208 returns the congestion control unit 200 to step 316. In another embodiment, the flow drop method 208 is capable of estimating how many low-priority multimedia data flows, in a set of low-priority flows, to drop in order to alleviate the congestion condition. In this embodiment, the method then drops the estimated set of low-priority multimedia data flows to alleviate the congestion condition. If the low priority queue is not full then the flow drop method ends.

Figure 5:
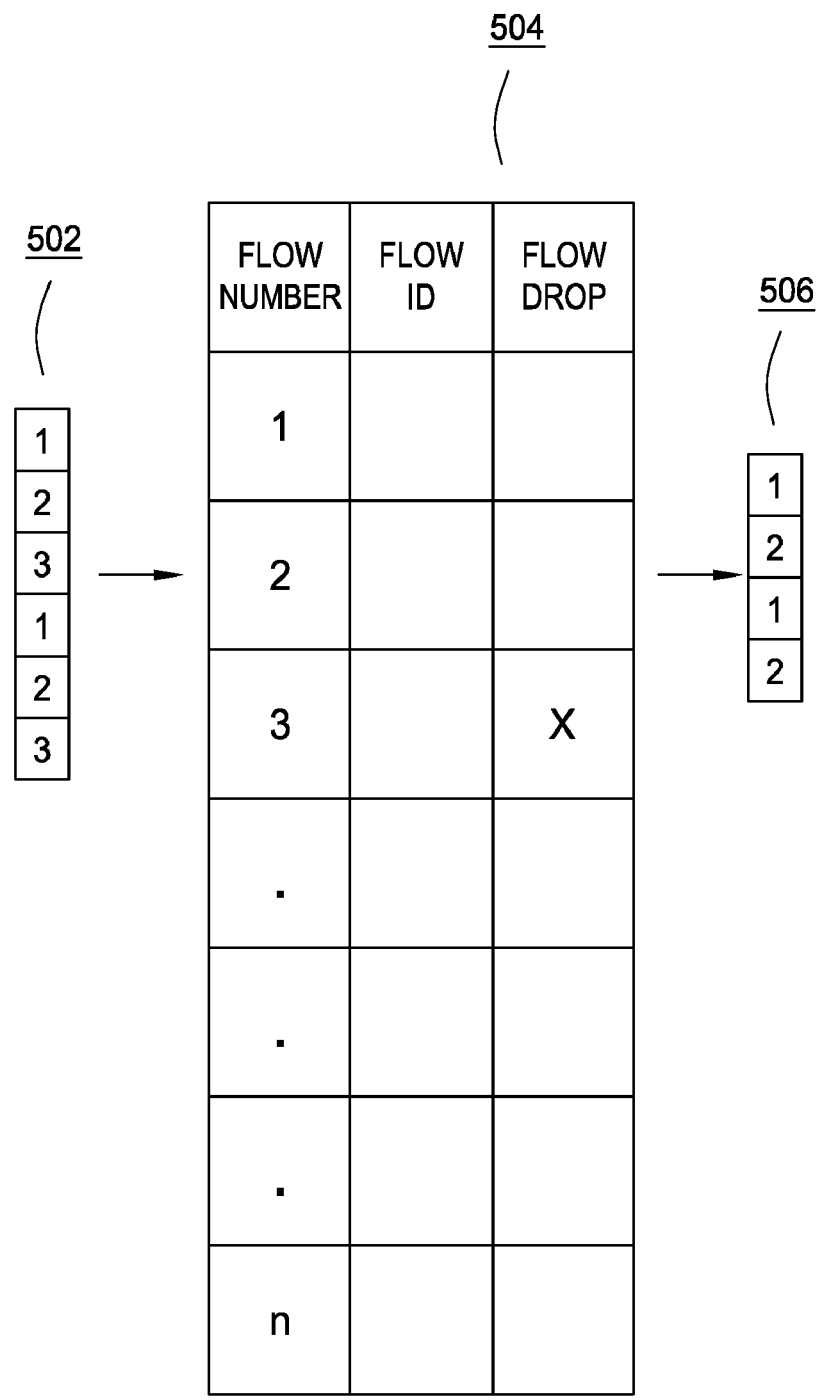
FIG. 5 is a block diagram of a multimedia data flow drop table in accordance with an embodiment of the present invention.

FIG. 5 is a block diagram of a multimedia data flow drop table 506 in accordance with an embodiment of the present invention. FIG. 5 contains an incoming flow of multimedia data 502 containing packets from three different incoming flows; a multimedia data flow drop table 506; and an outgoing flow of multimedia data 504 containing packets from two flows. Packets of flow 3 have been marked as dropped due to the presence of a congestion condition.

In this embodiment, flow drop table 506 contains at least two fields:; a flow identification field and a flow drop field. Flow drop table 506 is capable of supporting one or more multimedia data flows, as determined by the network administrator. The flow identification field contains certain accounting information that allows the congestion control unit 200 the ability to uniquely identify the source, destination, and priority of a particular multimedia data flow. This information uniquely identifies multimedia data packets belonging to the multimedia flow. The flow identification field can be defined by source IP, source UDP, source RTP, destination IP, destination UDP, and destination RTP. In another embodiment, the flow identification field can be defined by the destination IP and the destination UDP. The flow identification field can also contain a numerical designation representing a particular multimedia data flow passing through the IP network. The flow drop field contains a symbolic designation representing that a particular flow has been marked to be dropped. One skilled in the art will appreciate other embodiments of flow drop table 506 that contain only the flow identification field and the flow drop field.

FIG. 5 represents a graphical display of packets of a particular multimedia data flow (number 3) being selected from an incoming flow 502 of multimedia data flow data and marked for dropping in the flow drop table 506. The outgoing flow 504 of multimedia data does not contain packets from multimedia data flow number 3 as it has been dropped completely. By completely dropping all packets of multimedia data flow number 3, multimedia data flow numbers 1 and 2 are able to pass through an IP network, uncorrupted, shortly after a congestion condition has been detected.

Figure 6A:
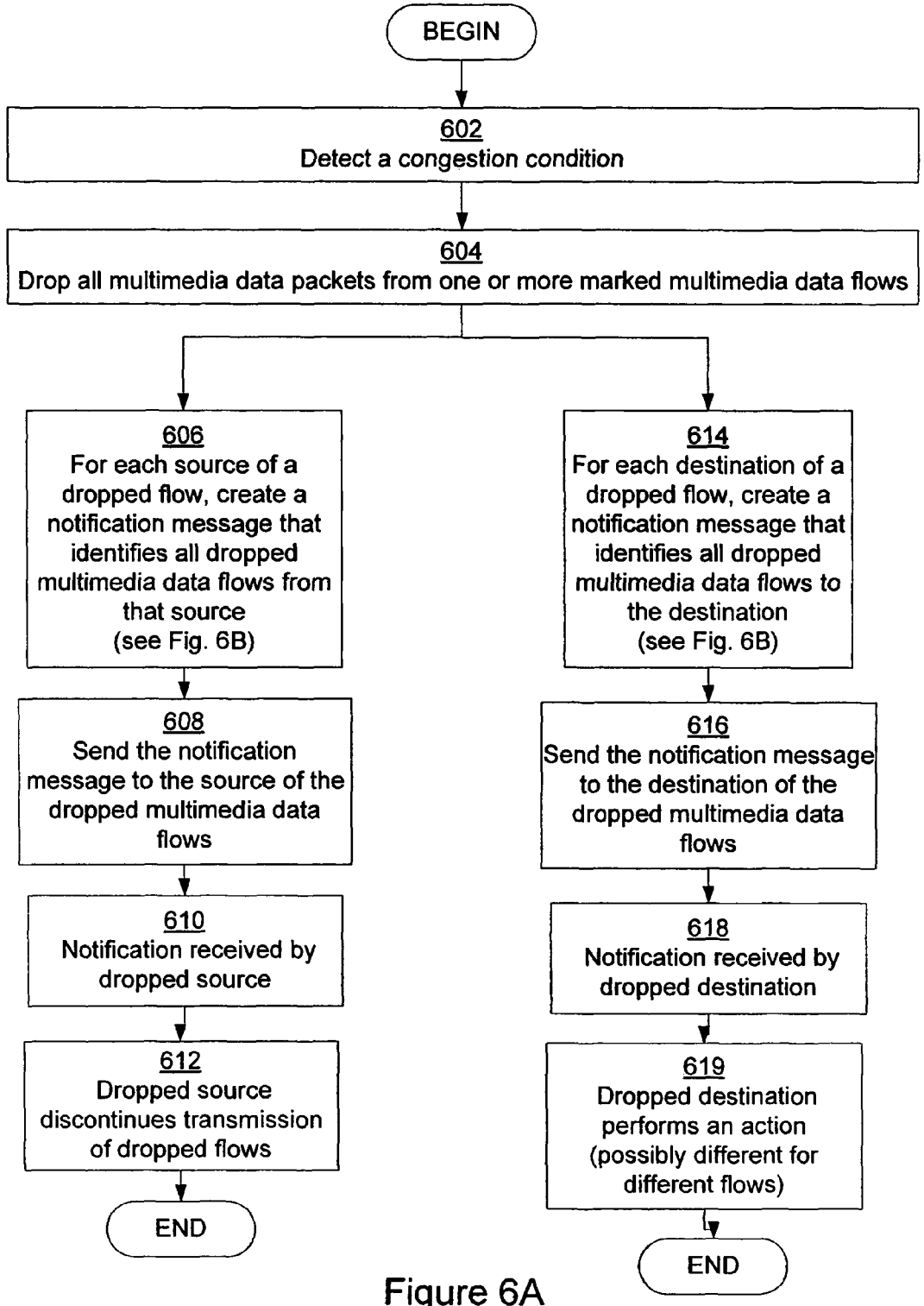
FIGS. 6A-6C are flow diagrams describing a method for notifying a source and destination of one or more multimedia data flows that the one or more multimedia data flows have been dropped, according to an embodiment of the present invention.
Figure 6B:
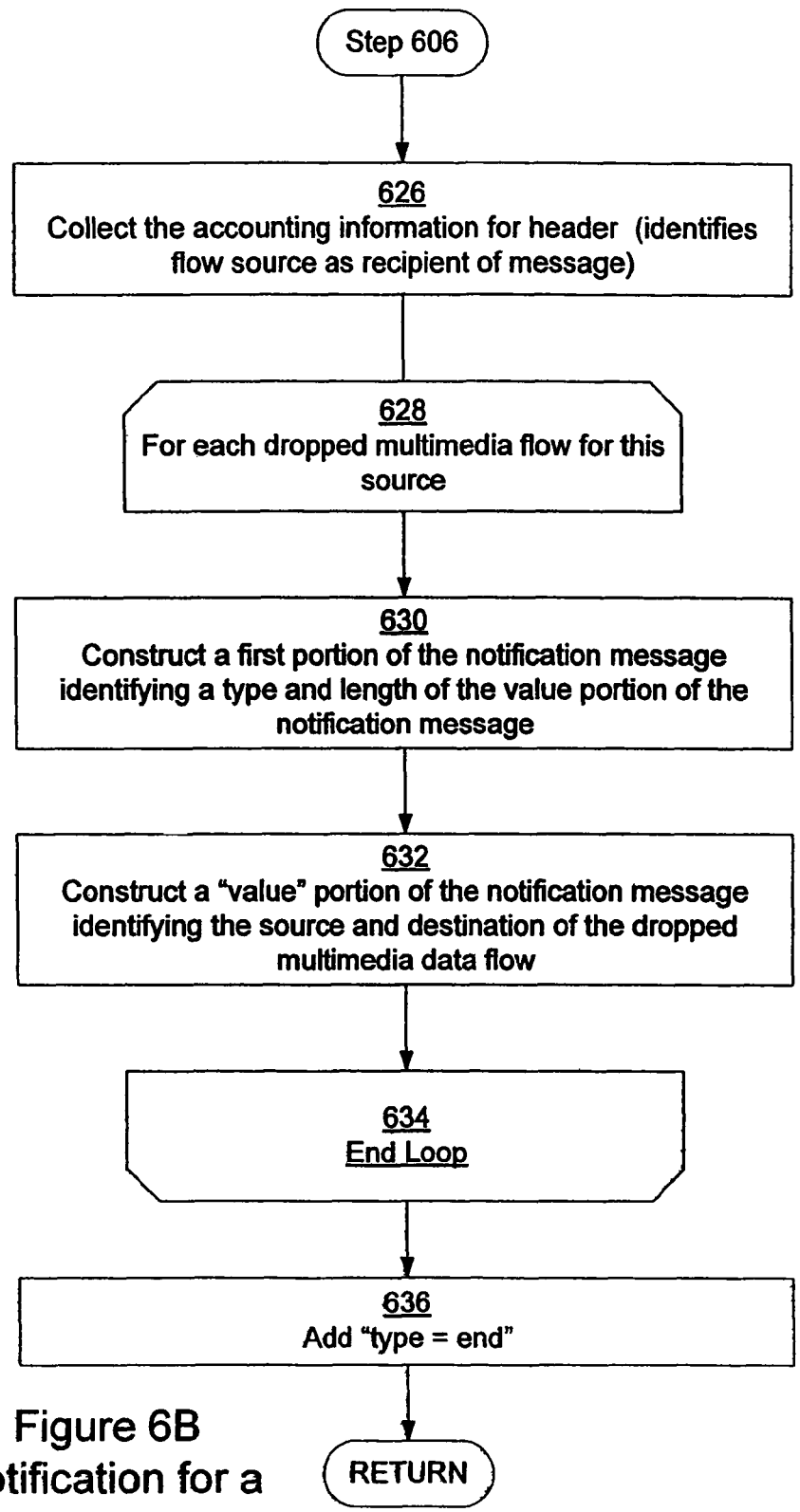
Figure 6C:
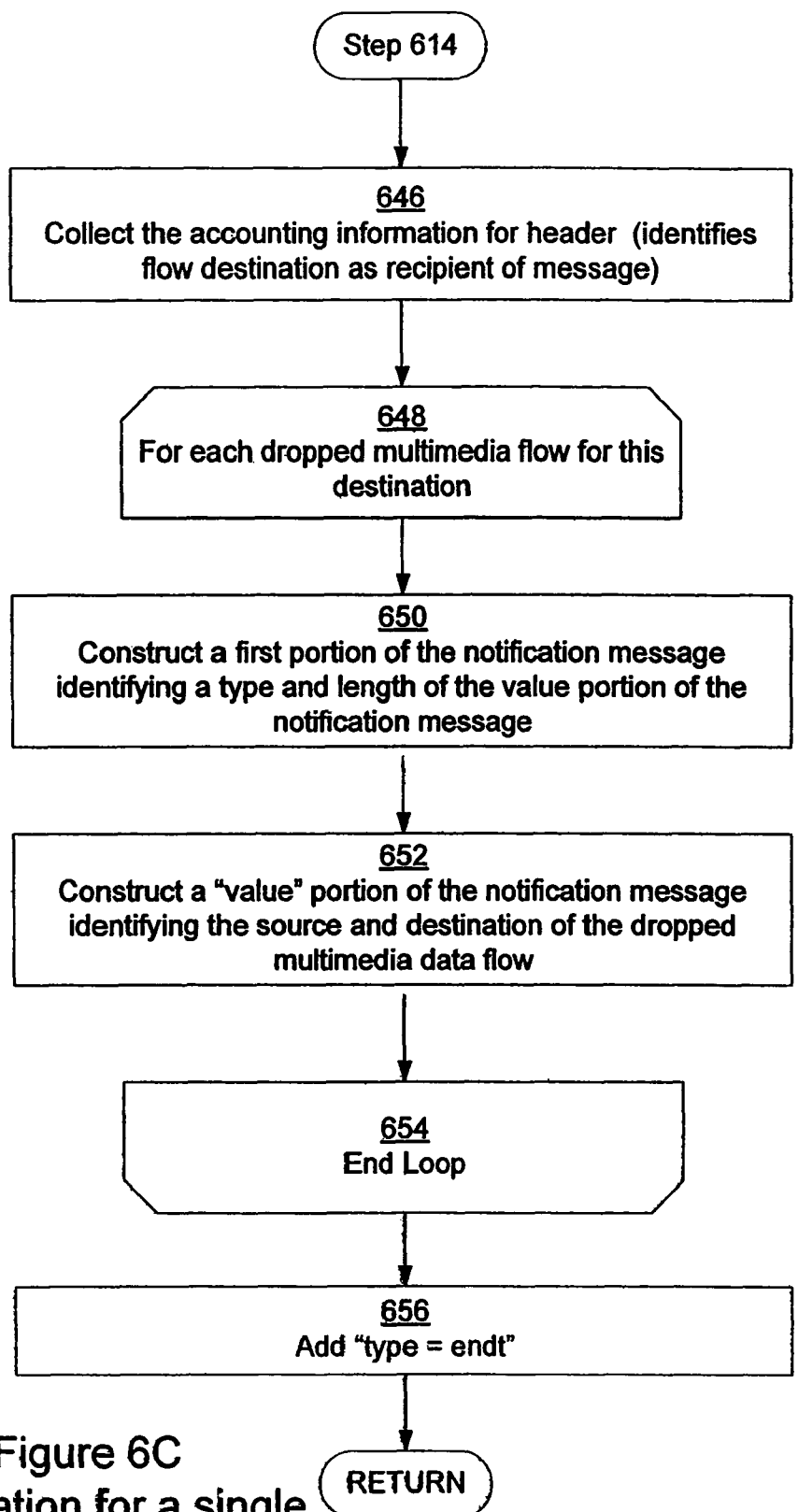

FIGS. 6A-6C are flow diagrams describing a method for notifying a source and destination of one or more multimedia data flows have that the one or more multimedia data flows have been dropped, according to an embodiment of the present invention. FIG. 6B describes a method for sending a notification message to a source. FIG. 6C describes a method for sending a notification message to a destination. As described above in relation to FIG. 2 and FIGS. 4A-4C, and illustrated in FIG. 6A, the flow drop method 208 is adapted to detect 602 a congestion condition and drop 604 all multimedia data packets from one or more marked multimedia data flows. It will be understood that the multiple dropped multimedia dataflows may not all have the same source or destinations. Preferred embodiments of this invention combine notification for multiple dropped multimedia data flows into each notification message if there are multiple dropped flows for the receiver of the message. A notification message is sent to each of the sources of multiple dropped flows and a notification message is sent to each of the destinations of multiple dropped multimedia flows. Because not all flows have the same source and destination and because each notification message can refer to more than one data flow, separate notification messages are needed for the various sources and destinations.

As shown in FIG. 6A, the flow drop method 208 creates 606/614 a notification message for each source of a dropped multimedia data flow. Each of these notification messages to a source or a destination can refer to more than one dropped flow. More details on the creation of a notification message for sources are discussed later in relation to FIGS. 6B and 7.

Once a notification message is created 606 for the source of each dropped flow (also called a "dropped source"), the flow drop method 208 sends 608 a notification message to each of the sources of the dropped multimedia data flows. When the notification message is received 610 by the dropped source, the source of the dropped multimedia data flows discontinues 614 transmission of the dropped multimedia data flows.

As also shown in FIG. 6A, for each destination of a dropped flow, the flow drop method 208 creates 614 a notification message for each destination of a dropped multimedia data flow. Each of these notification messages can refer to more than one dropped flow. More details on the creation of a notification message for destinations are discussed later in relation to FIGS. 6C and 7.

Once a notification message is created 614 for the destination of each dropped flow (also called a "dropped destination"), the flow drop method 208 sends 616 a notification message to each of the destinations of the dropped multimedia data flows. When the notification message is received 618 by the dropped destination, each destination of the dropped multimedia flows performs 619 at least one predetermined action, such as displaying a notice that the multimedia data flow has been temporarily dropped. Another example of an action taken by a destination receiving notice that a multimedia flow has been dropped is that the destination re-requests the stream to be sent after a timeout. In this situation, for example, the source might use the information and/or report it to an upstream management system to help correlate the failure. In some embodiments, the different destinations perform different predetermined actions. In some embodiments, any single destination may perform different predetermined actions for different dropped flows.

It will be noted that in the described embodiment, notification messages are sent to both the source and destination of a dropped multimedia data flow. Because multiple dropped data flows are included in these packets, the notification messages are sent to the source and destination In FIG. 6B, a flow diagram illustrates a method for creating a notification message for a source of one or more dropped multimedia data flows, according to an embodiment of the present invention. It will be understood that such a notification message is created for each source of one or more dropped flows. Initially, the flow drop method 208 is adapted to collect 626 information for the notification header, identifying the source as the recipient of the notification message. Next, for each 628 dropped multimedia data flow from the source, the flow drop method 208 constructs 630 a first portion of the notification message identifying a type and length of the value portion of the notification message. The type corresponds to a "notification" type. Next, the flow drop method 208 constructs 632 a "value" portion of the notification message that uniquely identifies the dropped multimedia data flow.

This "value" portion" can contain any information that identifies the multimedia data flow. For example, the value portion might contain information extracted from multimedia data flow packets such as a unique IP source and IP detination address for the dropped flow. As another example, the value portion might contain a UDP source port and a UDP destination port of the dropped flow. Elements 630 and 632 are repeated 634 for each flow dropped from this source. Lastly, a type of "end" is added to indicate the end of the notification message and the notification message is ready to be sent, so the flow drop method 208 returns to step 608 of FIG. 6A.

In FIG. 6C, a flow diagram illustrates a method for creating a notification message for a destination of one or more dropped multimedia data flows, according to an embodiment of the present invention. It will be understood that such a notification message is created for each destination of one or more dropped flows. Initially, the flow drop method 208 is adapted to collect 646 information for the notification header, identifying the flow destination as the recipient of the notification message. Next, for each 648 dropped multimedia data flow to the destination, the flow drop method 208 constructs 650 a first portion of the notification message identifying a type and length of the value portion of the notification message. The type corresponds to a "notification" type. Next, the flow drop method 208 constructs 652 a "value" portion of the notification message identifying the dropped multimedia data flow. This "value" portion" can contain any information extracted from the multimedia data flow packets that identifies the multimedia data flow. For example, the value portion might contain a unique IP source and IP destination address for the data flow. As another example, the value portion might contain a UDP source port and a UDP destination port of the dropped flow. Elements 630 and 632 are repeated 634 for each flow dropped for this destination. Lastly, a type of "end" is added to indicate the end of the notification message and the notification message is ready to be sent, so the flow drop method 208 returns to step 616 of FIG. 6A.

Figure 7:
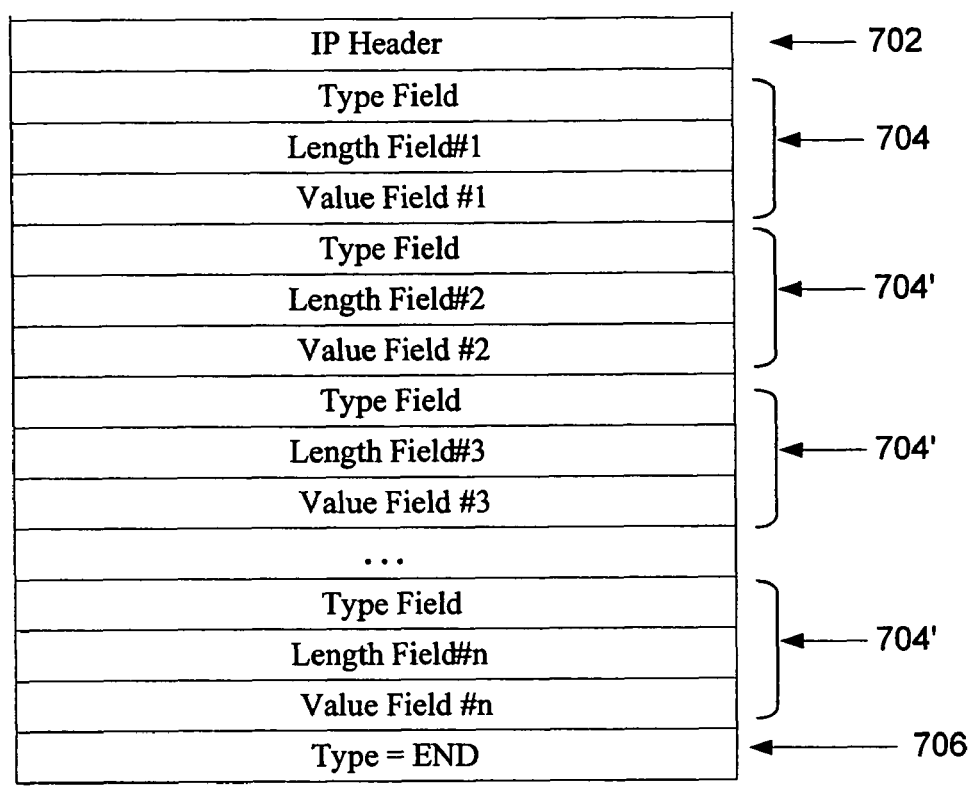
FIG. 7 is a diagram illustrating a congestion notification message, in accordance with an embodiment of the present invention.

FIG. 7 is a diagram illustrating a format of a congestion notification message 700, in accordance with an embodiment of the present invention. As described in FIGS. 6A-6C, the flow drop method 208 is adapted to construct and send notification messages 700 to the source(s) and destination(s) of dropped data flows in response to determining that entire multimedia data flows are to be dropped. Each notification message can reference multiple data flows. In an embodiment, the notification message 700 has a header 702 and a one or more fields 704/704'. Also, the notification message contains an end field 706 indicating that the end of the notification message has been reached. It will be understood that the notification message can contain other fields not shown herein.

In an embodiment, the source of the notification message is an in-line router located within the network. In some embodiments, a notification message is sent from a node or entity dedicated to that function instead of by the node or entity that made a decision to drop the multimedia data flow. Thus, in some embodiments, the function of sending notification packets can be offloaded to a separate functional unit.

The header 702 of the notification message 700 identifies, among other things, a destination of the notification message, such as an IP address of the flow source or flow destination that will receive the notification message. Other embodiments may contain, for example, a UDP port number for the destination of the notification message.

Each of the fields 704/704' of the notification message contain information identifying a dropped multimedia data flow. The information also includes a type of "notification"

and a length of the value information. The value information identifies a dropped multimedia data flow. Here, a message sent to a source might identify a first subgroup of the multimedia flows to be dropped (i.e., the dropped flows originating at that source). A message sent to a destination might identify a second subgroup of the multimedia flows to be dropped (i.e., the dropped flows destined for that destination). In another embodiment, the value information contains at least an IP address for the source of the dropped multimedia data flow and an IP address for a destination of the dropped multimedia data flow since these two pieces of information are sufficient to identify a multimedia data flow. In another embodiment, the value information contains at least an IP address for the source of the dropped multimedia data flow, an IP address for the destination of the dropped multimedia data flow, a UDP port number for the source of the dropped multimedia data flow, and a UDP port number for the destination of the dropped multimedia data flow. In another embodiment, the value information contains at least an IP address for the source of the dropped multimedia data flow, a IP address for the destination of the dropped multimedia data flow, a UDP port number for the source of the dropped multimedia data flow, a UDP port number for the destination of the dropped multimedia data flow, an RTP address header for the source of the dropped multimedia data flow, and an RTP address header for the destination of the dropped multimedia data flow. In an embodiment, the specific value information stored within field 704/704' is a user-configurable value. One of ordinary skill in the art will appreciate that the value information contains at least enough information to sufficiently identify the dropped multimedia data flow.

In an embodiment, the field 704 is packaged in a value field of a type-length-value (TLV) encoded payload. In this embodiment, the length field of the type-length-value encoded payload determines the size (in bytes or any particular unit) of the second set of accounting information packaged within the value field of the TLV encoded payload. In an embodiment, the length of the TLV encoded payload representing the size of the second set of accounting information is 64 bytes. In an embodiment, the length and value fields in the TLV encoded payload are user-configurable values that can be set to a length and value sufficient to uniquely identify the multimedia data flow that has been dropped. The type field of the type-length-value encoded payload identifies what type of multimedia data is identified by the second set of accounting information. In an embodiment, the number of fields 704' in stored in a notification message 700 depends upon a network maximum transmission limit. In the case that the notification message 700 exceeds the network maximum transmission limit, the flow drop method 208 is adapted to create additional notification messages 700 that alert the source and destination of the dropped multimedia data flows regarding the status of all of the dropped multimedia data flows. In an embodiment, a network maximum transmission unit is 1500 bytes, as is the case with Ethernet.

Once the notification message 700 is created, the flow drop message is adapted to send the message 700. The notification message 700 can be sent based upon a variety of conditions. In an embodiment, the message 700 is sent when the message exceeds the network maximum transmission limit. In an embodiment, the message 700 is sent when the processing of the drop table 506 is complete and the flow drop method 208 determines that no multimedia data flows remain to be dropped. In an embodiment, the notification message 700 is sent when an administrative configurable timeout occurs, which can be 100 milliseconds, or any particular time suitable to the particular network constraints envisioned by the network administrator.

As will be understood by those familiar with the art, the invention may be embodied in other specific forms without departing from the spirit or essential characteristics thereof. Likewise, the particular naming and division of the modules, managers, features, attributes, methodologies and other aspects are not mandatory or significant, and the mechanisms that implement the invention or its features may have different names, divisions and/or formats. For example, modules can be implemented as portions of computer readable instructions contained in a memory of a data processing system and executed by a processor of the data processing system. In one embodiment, computer-executable instructions may be contained on a computer readable medium that is included in a computer program product. Furthermore, as will be apparent to one of ordinary skill in the relevant art, the modules, managers, features, attributes, methodologies and other aspects of the invention can be implemented as software, hardware, firmware or any combination of the three. Of course, wherever a component can be implemented as a standalone program, as part of a larger program, as a plurality of separate programs, as a statically or dynamically linked library, as a kernel loadable module, as a device driver, and/or in every and any other way known now or in the future to those of skill in the art of computer programming.

In another embodiment, a separate network entity provides congestion relieving services to one or more network entities, such as routers or other network nodes, by performing the sending of notification messages (as described above) at the behest of the entity, once when the entity has determined which data flows to drop.

While the present invention has been described with reference to certain preferred embodiments, those skilled in the art will recognize that various modifications may be provided. For example, certain embodiments employ multiple application servers, acting in cooperation to perform a function or request. Any of the above functions or requests can be sent across a network, or using local cables such as IEEE1394, Universal Serial Bus, or wireless networks such as IEEE 802.11 or IEEE 802.15 networks, in any combination. Variations upon and modifications to the preferred embodiments are provided for by the present invention, which is limited only by the following claims.

What is claimed is:

1. A method for correcting a congestion condition within a network by a device in the network, comprising:
    receiving, by the device, a plurality of data packets to be forwarded by the device, each data packet being associated with one of a plurality of multimedia data flows via header information in the respective data packet;
    from the plurality of multimedia data flows, identifying at least a first multimedia data flow to be dropped by the device to relieve the congestion condition within the network, based on a priority level associated with the first multimedia data flow, wherein a second multimedia data flow of the plurality of multimedia data flows is not identified to be dropped;
    forwarding data packets associated with the second multimedia data flow and not data packets associated with the first multimedia data flow, wherein the data packets associated with the first multimedia data flow are dropped;

sending a first notification message to a source from which the first multimedia data flow originates in the network, to instruct the source to stop sending the first multimedia data flow; and sending a second notification message to a destination of the first multimedia data flow, to instruct the destination to perform a predefined action responsive to the device identifying the first multimedia data flow to be dropped.

2. The method of claim 1, wherein the device comprises an in-line router located within the network.

3. The method of claim 2, wherein a count of data flows in the first multimedia data flow is a user-configurable value.

4. The method of claim 1, wherein the first notification message contains information identifying the first multimedia data flow, where the first multimedia data flow is to be dropped by the source.

5. The method of claim 4, wherein the information identifying the first multimedia data flow includes at least an IP address for the source of the notification message, an IP address for the source of the first multimedia data flow, a UDP port number for the source of the notification message, and a UDP port number for the source of the first multimedia data flow.

6. The method of claim 4, wherein the information identifying the first multimedia data flow includes at least an IP address for the source of the first multimedia data flow and an IP address for each destination of the first multimedia data flow.

7. The method of claim 4, wherein the information identifying the first multimedia data flow includes at least an IP address for the source of the first multimedia data flow, an IP address for the destination of first multimedia data flow, a UDP source port number for the source of the first multimedia data flow, a UDP destination port number for the destination of the first multimedia data flow, an RTP address header for the source of the first multimedia data flow, and an RTP address header for the destination of the first multimedia data flow.

8. The method of claim 4, wherein the information identifying the first multimedia data flow is packaged in a value field of a type-length-value encoded payload, wherein the first multimedia data flow is to be dropped by the source.

9. The method of claim 1, wherein the second notification message contains information identifying the first multimedia data flow, where the first multimedia data flow is to be dropped by the destination.

10. The method of claim 9, wherein the information identifying the first multimedia data flow includes at least an IP address for the source of the first multimedia data flow, an IP address for the destination of the first multimedia data flow, a UDP source port number for the source of the first multimedia data flow, a UDP destination port number for the destination of the first multimedia data flow, an RTP address header for the source of the first multimedia data flow, and an RTP address header for the destination of the first multimedia data flow.

11. The method of claim 9, wherein the information identifying the first multimedia data flow includes at least an IP address for the source of the first multimedia data flow and an IP address for each destination of the first multimedia data flow.

12. The method of claim 9, wherein the information identifying the first multimedia data flow includes at least an IP address for each source of the first multimedia data flow, an IP address for the destination of the first multimedia data flow, a UDP port number for the source of the first multimedia data flow, and a UDP port number for the destination of the first multimedia data flow.

13. The method of claim 12, wherein a count of data flows in the first multimedia data flow depends upon a network maximum transmission limit.

14. The method of claim 1, wherein the destination of the first multimedia data flow is a set-top-box.

15. The method of claim 1, wherein the destination of the first multimedia data flow is a cable modulator that is serving a set-top-box.

16. The method of claim 1, wherein the device includes a plurality of prioritized queues, wherein the priority level associated with each data packet is determined based on the header information associated with the respective data packet, and wherein each data packet is stored in a prioritized queue selected from the plurality of prioritized queues, based on the priority level of the respective data packet;

wherein the congestion condition is determined to exist when a prioritized queue of the plurality of prioritized queues is full, wherein the prioritized queue that is full stores at least two multimedia data flows, and wherein the first multimedia data flow is selected randomly from the at least two multimedia data flows;

wherein the predefined action comprises at least one of: (i) outputting an indication that the first multimedia data flow has been dropped; and (ii) upon a predetermined time period elapsing, requesting the source to re-send the first multimedia data flow;

wherein a plurality of multimedia data flows are identified to be dropped, wherein the plurality of multimedia data flows includes the first multimedia data flow, wherein a first subset of the plurality of multimedia data flows originate from the source, wherein a second subset of the plurality of multimedia data flows is to be forwarded by the destination, wherein the second subset is different from the first subset;

wherein the first notification message instructs the source to stop sending the first subset of the plurality of multimedia data flows, and wherein the second notification message is sent to a destination of the first multimedia data flow, to instruct the destination to perform the predefined action.

17. A computer program product including a non-transitory computer-readable medium having computer-executable instructions contained thereon, the computer-readable instructions capable of causing a computer of a network device in a network to perform the following:

receiving, by the computer of the network device, a plurality of data packets to be forwarded by the network device, each data packet being associated with one of a plurality of multimedia data flows via header information in the respective data packet;

receiving an identification of at least a first multimedia data flow of the plurality of multimedia data flows, to be dropped by the network device to relieve a congestion condition within the network, wherein the identification is based on a priority level associated with the first multimedia data flow, wherein no identification of a second multimedia data flow of the plurality of multimedia data flows is received, and wherein the network device is configured to forward data packets associated with the second multimedia data flow and not data packets associated with the first multimedia data flow, wherein the data packets associated with the first multimedia data flow are dropped;

sending a first notification message to a source from which the first multimedia data flow originates, to instruct the source to stop sending the first multimedia data flow; and sending a second notification message to a destination of the first multimedia data flow, to instruct the destination to perform a predefined action responsive to the identification of the first multimedia data flow to be dropped by the network device.

18. A system, comprising:
a module that receives a plurality of data packets to be forwarded by the system, each data packet being associated with one of a plurality of multimedia data flows via header information in the respective data packet;
a module that receives an identification of at least a first multimedia data flow to be dropped by the system to relieve a congestion condition in a network, wherein the identification is based on a priority level associated with the first multimedia data flow, wherein no identification of a second multimedia data flow of the plurality of multimedia data flows is received, and wherein the system is configured to forward data packets associated with the second multimedia data flow and not data packets associated with the first multimedia data flow, wherein the data packets associated with the first multimedia data flow are dropped;
a module that sends, by operation of a computer processor, a first notification message to a source from which the first multimedia data flow originates, to instruct the source to stop sending the first multimedia data flow; and
a module that sends a second notification message to a destination of the first multimedia data flow, to instruct the destination to perform a predefined action responsive to the identification of the first multimedia data flow to be dropped by the system.

19. The system of claim 18, further comprising at least one of:
a source module receiving the first notification message and at least temporarily stopping transmission of the first multimedia data flow; and
a destination module receiving the second notification message and performing the predefined action in accordance with the received second notification message.

20. The system of claim 18, further comprising a module, coupled to the module that receives, that identifies the first multimedia data flow to be dropped by the system to relieve the congestion condition.

21. A source entity in a computer network, comprising:
a first module of the source entity in the computer network, for sending a plurality of data packets to a transmitting entity in the computer network, to be forwarded by the transmitting entity to a destination entity in the computer network, wherein each data packet is associated with one of a plurality of multimedia data flows via header information in the respective data packet;
a second module of the source entity, for receiving a first notification message from the transmitting entity, wherein the first notification message identifies, from the plurality of multimedia data flows, at least a first multimedia data flow to be dropped by the transmitting entity based on a priority level associated with the first multimedia data flow and to relieve a congestion condition within the computer network, wherein a second multimedia data flow of the plurality of multimedia data flows is not identified to be dropped; and
a third module of the source entity to effect, by operation of a computer processor, stopping transmission of data packets associated with the first multimedia data flow identified in the first notification message received by the second module of the source entity and not data packets associated with the second multimedia data flow;
wherein the transmitting entity is configured to send a second notification message to the destination entity, to instruct the destination entity to perform a predefined action responsive to the transmitting entity identifying the first multimedia data flow to be dropped based on the priority level associated with the first multimedia data flow and.

22. A destination entity in a computer network, comprising:
a first module of the destination entity in the computer network, for receiving a plurality of data packets forwarded by a transmitting entity in the computer network, wherein the plurality of data packets originate from a source entity in the computer network, wherein each data packet is associated with one of a plurality of multimedia data flows via header information in the respective data packet, wherein the transmitting entity is configured to send a first notification message to the source entity, wherein the first notification message identifies, from the plurality of multimedia data flows, at least a first multimedia data flow to be dropped by the transmitting entity based on a priority level associated with the first multimedia data flow and to relieve a congestion condition within the computer network;
a second module of the destination entity, for receiving a second notification message from the transmitting entity, wherein the second notification message identifies the first multimedia data flow to be dropped by the transmitting entity based on the priority level associated with the at least one multimedia data flow, wherein the second notification message does not identify a second multimedia data flow of the plurality of multimedia data flows, and wherein the transmitting entity is configured to forward data packets associated with the second multimedia data flow and not data packets associated with the first multimedia data flow, wherein the data packets associated with the first multimedia data flow are dropped; and
a third module of the destination entity to perform, by operation of a computer processor, a notification function to inform a second entity that transmission of the first multimedia data flow identified in the second notification message received by the second module of the destination entity is to cease.

23. A method, performed by a device in a network that provides a congestion relieving service to at least one other entity in the network, comprising:
receiving, by the device in the network, a plurality of data packets to be forwarded by the device, each data packet being associated with one of a plurality of multimedia data flows via header information in the respective data packet;
receiving, from the at least one other entity, information identifying at least a first multimedia data flow that needs to be dropped to relieve a congestion condition within the network, wherein the identification is based on a priority level associated with the at least one multimedia data flow, wherein the information does not identify a second multimedia data flow of the plurality of multimedia data flows, wherein the device is configured to forward data packets associated with the second multimedia data flow and not data packets associated with the first multimedia data flow, wherein the data packets associated with the first multimedia data flow are dropped;

sending a first notification message, in response to receiving the information identifying the first multimedia data flow from the entity, to a source from which the first multimedia data flow originates in the network, to instruct the source to stop sending the first multimedia data flow; and sending a second notification message, in response to receiving the information identifying the first multimedia data flow from the entity, to a destination of the first multimedia data flow, to instruct the destination to perform a predefined action responsive to the first multimedia data flow being identified to be dropped by the device.

\* \* \* \* \*

UNITED STATES PATENT AND TRADEMARK OFFICE
CERTIFICATE OF CORRECTION

| | | |
|---|---|---|
| PATENT NO. | : 8,077,606 B1 | Page 1 of 1 |
| APPLICATION NO. | : 11/292757 | |
| DATED | : December 13, 2011 | |
| INVENTOR(S) | : Litwack | |

It is certified that error appears in the above-identified patent and that said Letters Patent is hereby corrected as shown below:

Column 8, Line 21, please delete ";";

Column 10, Line 4, please delete "detination" and insert --destination-- therefor;

In the Claims:

Column 13, Claim 7, Line 33, please insert --the-- after of;

Column 16, Claim 21, Line 11, please delete "and".

Signed and Sealed this
Thirteenth Day of March, 2012

David J. Kappos
*Director of the United States Patent and Trademark Office*